(12) United States Patent
Christ

(10) Patent No.: US 8,672,353 B2
(45) Date of Patent: Mar. 18, 2014

(54) SUPPORTING FOOT

(75) Inventor: Armin Christ, Bessenbach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 96 days.

(21) Appl. No.: 13/143,249

(22) PCT Filed: Jan. 18, 2010

(86) PCT No.: PCT/EP2010/050502
§ 371 (c)(1),
(2), (4) Date: Jul. 5, 2011

(87) PCT Pub. No.: WO2010/099995
PCT Pub. Date: Sep. 10, 2010

(65) Prior Publication Data
US 2011/0272931 A1    Nov. 10, 2011

(30) Foreign Application Priority Data
Mar. 3, 2009 (DE) .......................... 10 2009 001 288

(51) Int. Cl.
*B60S 9/02* (2006.01)

(52) U.S. Cl.
USPC .................................. 280/763.1; 248/188.8

(58) Field of Classification Search
USPC ........................... 280/475, 763.1–766.1, 762; 248/188.8–188.91; 212/301–306
See application file for complete search history.

(56) References Cited

U.S. PATENT DOCUMENTS 3,897,083 A     7/1975 Pickering
2006/0119072 A1*  6/2006 Riedl ............................ 280/475

OTHER PUBLICATIONS

European Search Report.

* cited by examiner

*Primary Examiner* — Jeffrey J Restifo
*Assistant Examiner* — Erez Gurari
(74) *Attorney, Agent, or Firm* — Price Heneveld LLP

(57) ABSTRACT

A supporting foot for a supporting device for vehicles, such as semi-trailers, comprising a foot element with a resting portion for resting on an underlying surface, and a compensating element for receiving a supporting element and for compensating for a positional offset of same by the compensating element being movable between a first and a second position with respect to the foot element, wherein the foot element has a guiding device in order to guide the supporting element in the longitudinal direction, and wherein the guiding device is formed from guiding portions which are arranged on either side of the supporting element and at least partially overlap with a distal end portion of the supporting element.

24 Claims, 2 Drawing Sheets

SUPPORTING FOOT

BACKGROUND OF THE INVENTION

The present invention relates to a compensating foot or supporting foot or landing gear for a supporting device for vehicles, such as semi-trailers or the like, in which at a lower end of a telescopic or extendable supporting tube a rolling segment may be swivel-supported, which rolling segment can be rolled along on a foot plate in order to compensate an offset in the position of the vehicle.

Compensating or supporting feet for compensating a positional offset are well-known in the prior art. Such supporting devices are arranged in pairs at the front bottom-side of semi-trailers, for example, and are employed when the semi-trailer is parked separate from the truck-trailer. In the case of longer parking times, leaks in the brake and air-spring systems cause the rear part of the semi-trailer to lower and, due to the locked parking brake of the mechanical axle suspension, the vehicle or the semi-trailer, respectively, moves forward. In this situation, the supporting devices or the supports thereof, respectively, are subject to bending and buckling stresses which might cause damage to or failure of the supports. In order to be able to compensate this positional offset, supporting feet have been developed which are arranged in such a way that they can be swiveled or moved horizontally. For example, DE 40 03 414 discloses a compensating or supporting foot which comprises a swivel-supported roller segment and a foot plate, wherein the roller segment can be rolled along on the foot plate. Many times, the positional offset of the vehicle occurs not only in the longitudinal direction of the vehicle, but also in the transverse direction thereof. A problem of the supporting feet from the prior art, however, is that the transverse forces are taken up via the roller segment. This leads to a great load on the swivel bearings of the roller segment, which has a negative influence on the wear and service life of the supporting feet.

Therefore, the object underlying the present invention is to provide a compensating or supporting foot for a supporting device of vehicles, such as semi-trailers or the like, by means of which the transverse forces acting on the supporting foot can be better compensated.

SUMMARY OF THE INVENTION

According to the invention, there is provided a supporting foot for a supporting device of vehicles, such as semi-trailers or the like, comprising a foot element with a resting portion for resting on an underlying surface, and a compensating element for receiving a supporting element and for compensating a positional offset of same by the compensating element being movable between a first and a second position with respect to the foot element, wherein the foot element comprises a guiding device in order to guide the supporting element in the longitudinal direction, and wherein the guiding device is formed from guiding portions which are arranged on either side of the supporting element and at least partially overlap with a distal end portion of the supporting element. Hence, the supporting foot particularly expediently forms part of a supporting device of vehicles or motor vehicles, such as farm vehicles, in particular semi-trailers, which are drawn by trucks in order to transport heavy loads. Thus, in the case of a vehicle uncoupled from a truck, the supporting foot is provided in order to transmit onto an underlying surface the forces introduced from the frame of vehicle into the supporting foot. The weight of the vehicle is transmitted via the supporting element into the compensating element, and from the latter via the foot element onto the underlying surface or ground. In the flow of forces between the foot element and the supporting element, there is provided the compensating element in order to balance or compensate a positional offset of the supporting element or of the vehicle, respectively, relative to the foot element. The term "positional offset" may be understood to mean in particular the form of the change of the position in the linear direction (for example horizontally or in the longitudinal direction or extension, respectively, of the foot element). It is also possible to balance or compensate an angular offset of the supporting element relative to the foot element, wherein said angular offset may occur in particular in the longitudinal direction of the vehicle or essentially parallel to the swivel plane due to the curved rolling surface of the compensating element. To put it differently, the compensating element and the foot element may be displaced relative to each other between a first position or an original position or a zero position, in which the compensating element is arranged essentially centrally relative to the foot element, and a second position. Consequently, the second position is in particular a deflected position, wherein the displacement of the compensating element particularly advantageously—departing from the original position—may take place both towards the front (front position) and towards the rear (rear position) (seen relative to the foot element). Thus, the first position is in particular between the front and the rear positions. Since the compensating element expediently can be rolled along on the foot element, the first and the second positions are preferably located essentially along a straight line or a line or an axis or in a swivel plane. The resting portion of the foot element is essentially designed plate-shaped and may have an essentially rectangular shape with a longitudinal extension which is larger than the width thereof. Expediently, the compensating element is swivel-supported, wherein the term "swivel-supported" is to be interpreted to mean that the compensating element may be supported in such a manner that it can be swiveled about a swivel axis relative to the foot element. The swivel axis may essentially coincide with the bearing axis of the supporting element and, expediently, is essentially perpendicular to the longitudinal extension or longitudinal axis of the foot element, or is essentially perpendicular to a plane in which lies the longitudinal extension of the foot element, respectively. Advantageously, the compensating element can be rolled along on a rolling portion of the foot element, which portion is preferably arranged opposite of a side of the resting portion of the foot element facing the underlying surface. In order to ensure that the compensating element can be rolled along, the compensating element may comprise a rolling surface which is curved along the swivel plane. Here, the swivel plane is essentially parallel to the longitudinal axis of the foot element or essentially perpendicular to the swivel axis of the compensating element, respectively, wherein the curvature of the rolling surface may have any design. However, it is particularly advantageous when the curvature of the rolling surface is curvilinear or circular, i.e. not square or angular. Thus, the curvature of the compensating element along the swivel plane makes it possible for the compensating element to be rolled along on the foot element along the longitudinal extension thereof so as to compensate a positional offset of the vehicle in the longitudinal direction. The compensating element may be designed single-part or multi-part so that the rolling surface of the compensating element may be formed by two (separate) elements spaced apart preferably in the transverse direction. In particular, the supporting element may be part of a telescopic supporting device. To put it differently, the supporting element represents the connection between the frame of the vehicle and the compensating foot formed by the foot element and the compensating element. To this end, the supporting element may be designed in particular in the form of a tube, which extends essentially vertically in the operational position. The foot element comprises a guiding device in order to guide the supporting element or the vehicle, respectively, in the longitudinal direction. Thus, the longitudinal direction corresponds to the direction of the positional offset of the vehicle or the direction of displacement of the vehicle or of the supporting element, respectively. Thus, by guiding the supporting element in the longitudinal direction, a movement of the supporting element in the transverse direction is limited or prevented, respectively. To this end, the guiding device is made from guiding portions of the foot element arranged on either side of the supporting element, which guiding portions overlap at least partially with a distal end portion of the supporting element. Thus, the guiding portions—seen in the longitudinal direction—are arranged adjacent to the supporting element, i.e. particularly expediently they extend essentially parallel to the longitudinal direction of the foot element. Here, the guiding portions overlap at least partially with a distal end region of the supporting element in the vertical direction such that a distal end portion of the supporting element at least in a certain region is arranged between the guiding portions and guided by them. The arrangement of the supporting element between the guiding portions is such that there is only little clearance in the transverse direction or a clearance width between the supporting element and the guiding portions of 10 mm at most, preferably 5 mm at most, and particularly preferably 3 mm at most. In particular, the free ends of the guiding portions overlap with the distal end portion of the supporting element at least partially. As a result, it becomes possible that lateral forces are supported by or transmitted to the foot element due to the contact of the distal end portion of the supporting element with the free end of the guiding portions so that lateral forces are introduced into the foot element in the case of a transverse offset of the vehicle. As a result, it is ensured that lateral forces are no longer or only partially transmitted into the foot element via the swivel bearing and the compensating element, which reduces wear and increases the operational safety.

Advantageously, the guiding portions overlap at least partially in each position of the supporting element with the distal end portion thereof. To put it differently, the guiding portions are designed such that the free ends thereof overlap at least partially in the vertical direction with the distal end portion of the supporting element in each position in the operational condition of the supporting foot. As a result, it is possible to ensure that transverse forces are transmitted in the first and second positions of the supporting element and in each position in between.

Expediently, the guiding portions are designed as wall portions extending preferably essentially perpendicularly from the resting portion. Thus, the guiding portion may be designed as a wall portion which extends preferably essentially perpendicularly from the resting portion or rolling portion, respectively, and along the longitudinal axis or longitudinal extension of the foot element. To put it differently, the guiding portions may be designed as elements or sections whose thickness (seen in the transverse direction) is essentially constant.

Preferably, the guiding portions comprise at least one engagement portion, the extension of which—departing from the first position—is larger in the longitudinal direction than the positional offset from the first position to the second position less half of the longitudinal extension of the supporting element. The engagement portion of the guiding portions, thus, is that portion which in the case of an overlap with the supporting element may engage with the distal end portion thereof. To put it differently, the engagement portion of the guiding portions is the section of possible overlap in the respective position of the supporting element. In particular, the extension of the engagement portions in the longitudinal direction is larger than the positional offset from the first position to the second position of the supporting element less half of the longitudinal extension of the supporting element or less the longitudinal extension from the distal end portion of the supporting element departing from the swivel axis of the compensating element to the second position. This ensures that in each position of the supporting element there is an overlap of the distal end portion thereof with the engagement portion of the guiding portion.

Particularly expediently, the guiding portions are arranged between the supporting element and the compensating element. To put it differently, the supporting foot is designed such that, when viewed in the transverse direction, the compensating element is located outside and that there are provided guiding portions adjacent thereto to the inside, between which guiding portions the supporting element can be arranged.

In a preferred embodiment, the rolling surface of the compensating element comprises at least in certain regions two recesses in which the guiding portions are arranged. The recesses are designed such that they extend essentially in the longitudinal direction. Here, the recesses are particularly expediently designed as longitudinal slots, wherein the width of the recesses is dimensioned such that the respective guiding portions are guided therein with little clearance. Consequently, due to the interaction of the guiding portion and the recess, an additional guiding of the compensating element in the transverse direction is made possible. The clearance between the guiding portion and the recess in the transverse direction, thus, expediently should be less than 10 mm, particularly expediently less than 5 mm, and particularly advantageously less than 3 mm.

Preferably, the guiding portions taper towards the free end thereof. In a side view seen in the direction of the transverse direction, the guiding portion thus may have the shape of a trapezoid.

In a preferred embodiment, the supporting element forms part of a telescopic supporting unit having a second supporting element, wherein the supporting element can be moved relative to the second supporting element between an operational position and a travel position, and wherein, in the travel position, the second supporting element engages with the foot element. Expediently, the supporting element and the second supporting element can be moved such that they pass each other along a slide-in and slide-out direction or can be fitted into each other or can be translatorily moved or are telescopic. Here, the second supporting element may be fixed essentially stationarily or frame-anchored or be fixed to the frame of the vehicle. Accordingly, the supporting element can be moved along the slide-in and slide-out direction. Particularly advantageously, the supporting element and the second supporting element may be arranged essentially concentrically relative to each other such that the supporting element is arranged or can be arranged within the second supporting element. To put it differently, the supporting element may be slid into the second supporting element. As a matter of course, it is also possible to provide more than two supporting elements which are telescopic. In the operational position of the supporting foot, the supporting element is displaced relative to the second supporting element towards the slide-out position, i.e. they are moved apart such that the supporting unit has a greater length. To put the vehicle into the travel operation the supporting element is displaced relative to the second supporting element into the slide-in position in which the supporting unit has essentially its smallest longitudinal extension. In the slide-in position or travel position of the supporting element, the second supporting element engages with the foot element or contacts it or touches it, respectively, so that the foot element is fixed relative to the supporting unit formed by the supporting element and the second supporting element and, thus, can make no relative movement (in particular in the longitudinal direction of the foot element) towards the supporting unit or the vehicle frame, respectively. To put it differently, the foot element is braced or clamped with the second supporting element of the supporting unit such that clattering noises of the foot plate may advantageously be prevented during the travel operation of the vehicle. Furthermore, creeping wear due to minimal movements of the elements relative to each other is reduced by fixing the foot element.

Expediently, in the travel position, the second supporting element engages with the guiding portions of the foot element. In particular, the guiding portions may comprise engagement edges for the contact with the second supporting element, which engagement edges are inclined relative to each other such that the guiding portion tapers towards its free end (whereas the wall thickness remains the same). This ensures that the foot element automatically takes its original or zero position in the travel operation.

It is furthermore preferred that the supporting foot comprises a pre-tensioning device in order to pre-tension the compensating element into the first position relative to the foot element, wherein the pre-tensioning device preferably comprises at least one spring which is braced between the foot element and the compensating element. This ensures that, when the supporting foot is spaced at a distance from the ground, i.e. when the supporting unit is retracted, the pre-tensioning device may bring the compensating element into the basic position or first position or original position. The spring is arranged in particular at the resting portion or rolling portion of the foot element. As a matter of course, there may also be provided a plurality of springs; for example, there may be provided two springs which—seen in the longitudinal direction or extension of the resting portion—are arranged or fixed at the front and at the rear, respectively, of the resting portion and, accordingly, are attached at the front and at the rear at the edge portions of the compensating element. Expediently, the springs are designed as coil springs and releasably attached to the foot element and the compensating element in order to ensure that replacement is simple.

Preferably, the guiding portions comprise at least a guiding recess or a guiding notch for guiding engagement means of the compensating element, wherein the guiding recess or the guiding notch preferably has a curved configuration, and wherein the middle portion thereof is closest to the resting portion. The guiding recess or the guiding notch may be designed as an aperture or slot, for example. It can also be merely a depression in the material so that it becomes possible to guide the engagement means. The engagement means may be designed as bolt, bar, journal or projection of any cross-sectional configuration. For example, the engagement means may have a round or angular cross-section. As a matter of course, the engagement means may be single-part and extend essentially over the entire width or transverse extension of the foot element (at least from the guiding notch of a first guiding portion to the guiding notch of an opposite guiding portion). Alternatively, the engagement means may also be multi-part and be arranged at (lateral) wall sections of the compensating element from which they extend into the guiding notch or guiding recess. Expediently, the engagement means are releasably fastened to the compensating element, which ensures that they are easier to replace. The engagement means engage with the guiding notch or guiding recess such that they are guided therein with clearance, wherein a guiding of the compensating element is ensured between the first position and the second position.

The curved configuration of the guiding notch or guiding recess, for example in the side view (essentially parallel to the transverse axis of the foot element), can be V shaped, round or angular (i.e. polygonal). Due to the curved configuration, the middle portion of the guiding notch or guiding recess expediently is closest to the middle portion of the resting portion. Said middle portion, thus, corresponds to the placement of the engagement means of the compensating elements in the first position thereof. To put it differently, the apexes of the V-shaped guiding recesses or guiding notches are thus the lowest point and, in the first position of the compensating element, they are arranged essentially vertically below the swivel axis of the compensating element.

Further advantages and features of the present invention result from the following description of preferred embodiments with reference to the appended Figures, wherein individual features of the embodiments may be combined to form new embodiments.

DETAILED DESCRIPTION OF THE PREFERRED EMBODIMENTS

Figure 1:
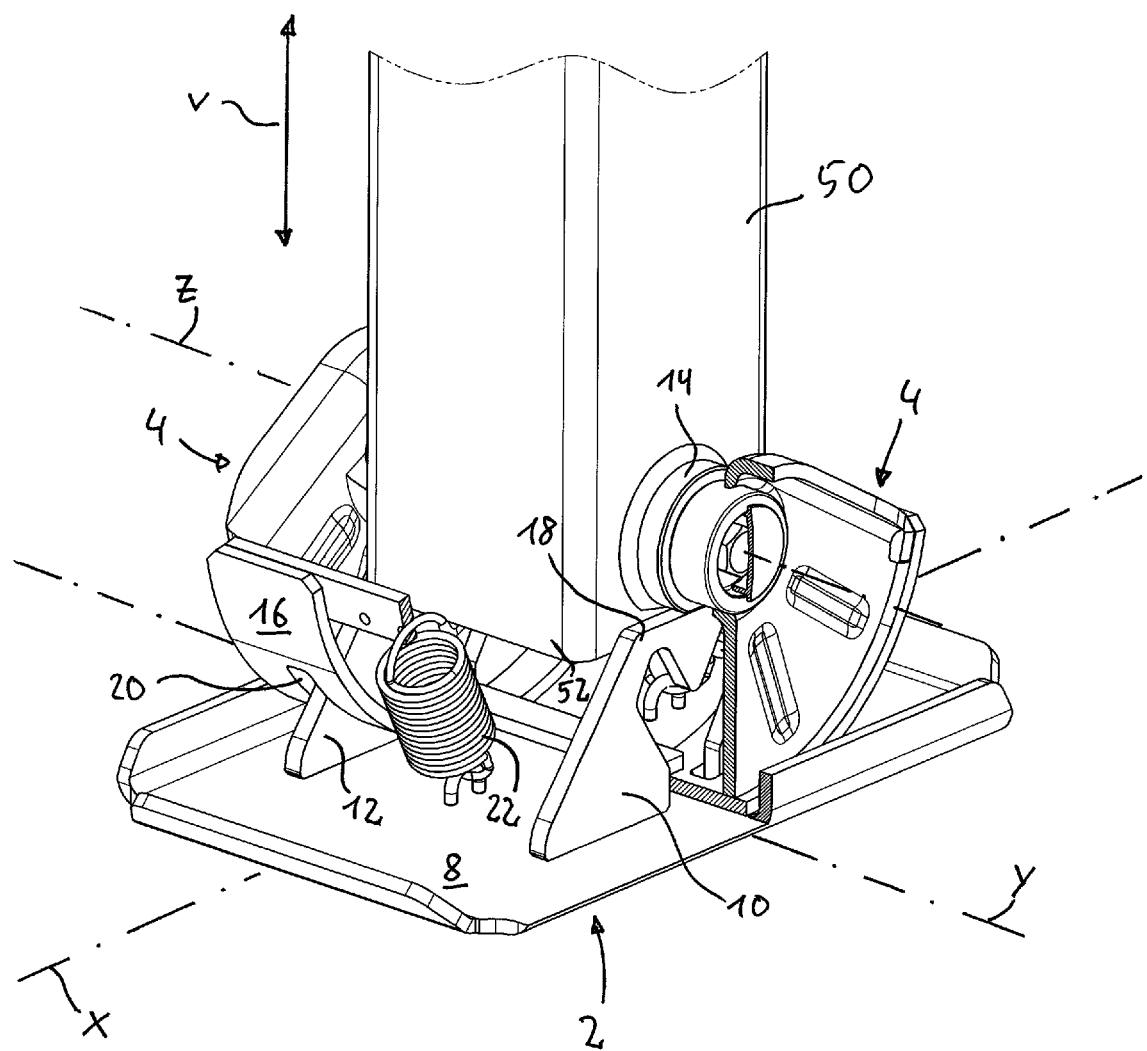
FIG. 1 is a perspective, partially cut view of a preferred embodiment of the supporting foot according to the invention.
Figure 2:
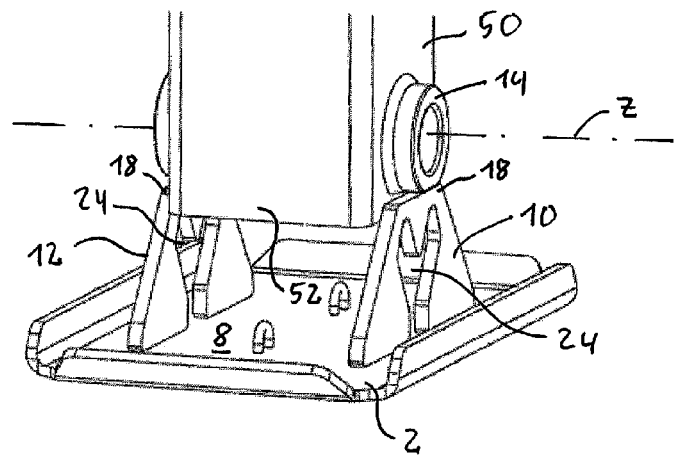
FIG. 2 is a perspective view of various (sub-)elements of a preferred embodiment of the supporting foot according to the invention.
Figure 3:
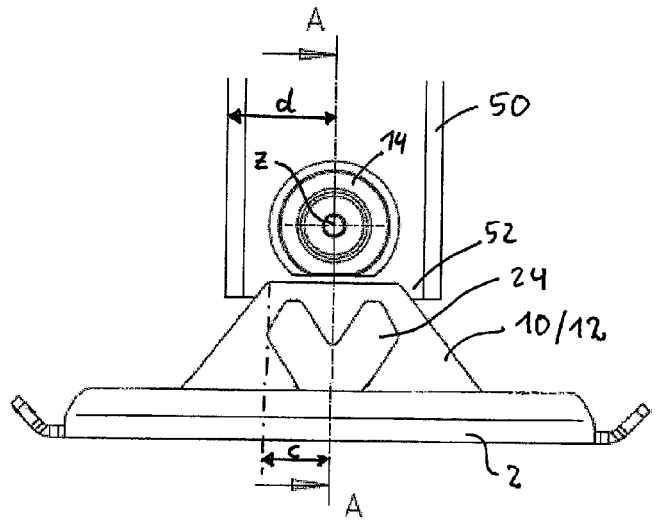
FIG. 3 is a side elevational view of various elements of a preferred embodiment of the supporting foot according to the invention.
Figure 4:
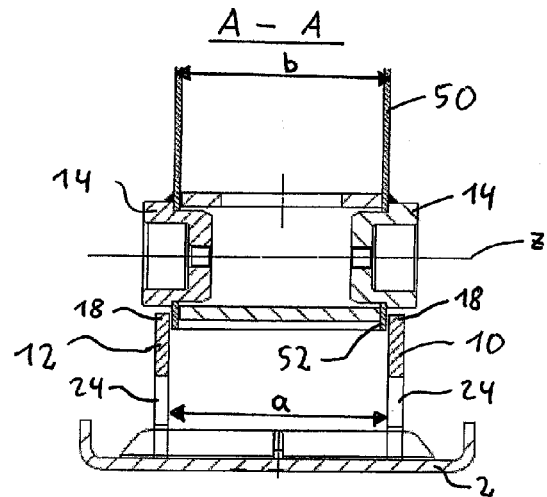
FIG. 4 is a front elevational view of various elements of a preferred embodiment of the supporting foot according to the invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

With reference to FIGS. 1 to 4, there is described an exemplary preferred embodiment of the compensating or supporting foot according to the invention, which only represents an exemplary description of the subject-matter of the invention, which may not be limited restrictively to the features shown.

The supporting foot comprises a foot element 2 as well as a compensating element 4 which are arranged in such manner that they can be swiveled or rotated or turned on the supporting element 50 which, for example, may be designed as a telescopic supporting tube and connected to the frame of the vehicle at the opposite side thereof.

The foot element 2 is essentially designed as a rectangular plate and comprises a resting portion 6 which rests on the underlying surface or ground. On the resting portion 6 (in particular at the side thereof which faces away from the ground) there is provided a rolling portion 8 along which the compensating element 4 can be rolled. The foot element 2 extends along the longitudinal direction x, which essentially coincides with the direction of displacement of the supporting element 50, wherein the foot element 2 extends transversely hereto in the transverse direction y, wherein the transverse axis or transverse direction y is essentially perpendicular to the longitudinal axis or longitudinal direction x. Here, the longitudinal direction x is essentially parallel to a plane in which the compensating element 4 may swivel, i.e. its swivel plane.

Furthermore, the foot element 2 comprises a guiding device which comprises a first guiding portion 10 and a second guiding portion 12. The guiding portions 10, 12 are expediently arranged along the longitudinal edge or along the longitudinal direction x of the foot element 2.

In the embodiment shown, the compensating element 4 comprises a swivel bearing 14 by means of which the compensating element 4 is connected to the supporting element 50 such that the compensating element 4 can be turned or swiveled relative to the supporting element 50 about a swivel axis z. Moreover, in the embodiment shown, the compensating element 4 comprises two rolling surfaces 16 which are spaced apart from each other in the transverse direction y and which interact with the rolling portion 8 of the foot element 2 in such a way that the compensating element 4 can be rolled along on the foot element 2. Thus, the compensating element 4 is movable relative to the foot element 2 between an original position or a first position (FIG. 1) and a deflected position or a second position, due to the fact that the compensating element 4 is supported about the swivel axis z in such a way that it can be swiveled and rolls along on the rolling portion 8 of the foot element 2.

The guiding portions 10, 12 of the foot element 2 are arranged on either side of the supporting element 50 such that they overlap at least partially with a distal end portion 52 of the supporting element 50, preferably in the vertical direction. The overlap is such that the distal end portion 52 comes into contact with an engagement portion 18 of the guiding portions 10, 12 when a load is exerted on the supporting element in the transverse direction y. This makes it possible that transverse forces acting on the supporting element 50 are introduced not at all or only partially into the foot element 2 via the compensating element 4, but mainly directly into the foot element 2 via one of the guiding portions 10, 12. In an exemplary embodiment, the guiding portions 10, 12 are arranged between the supporting element 50 and the compensating element 4. In the preferred embodiment shown, however, the rolling surface 16 has a respective recess 20 which essentially extends in the longitudinal direction x and is adapted to accommodate therein the guiding portion 10 and 12, respectively. This makes it particularly advantageously possible to guide also the compensating element 4 in the longitudinal direction x. The wall sections on the outer periphery of the foot element 2, which are shown in FIG. 1, are thus no longer necessary in order to guide the compensating element 4.

In order to bring the compensating element 4 or the supporting foot, respectively, into its original position, said supporting foot additionally comprises a pre-tensioning device in the form of springs 22, which are braced between the foot element 2 and the compensating element 4. The pre-tensioning device becomes effective in particular when the supporting foot is spaced apart from the ground in the vertical direction v, for example when the supporting element 50 is retracted into a second supporting element such that the supporting element 50 acts as a telescope inner tube.

The overlap between the guiding portions 10, 12 and the supporting element 50 expediently is such that the supporting element 50 is guided with only little clearance between the guiding portions 10, 12. For example, the clearance width a in the transverse direction y of the guiding portions 10, 12 corresponds to the transverse extension b of the supporting element 50 in the distal end portion 52 plus up to 10 mm, preferably about 3-5 mm, and particularly preferably up to 3 mm.

The engagement portions 18 of the guiding portions 10, 12 preferably have an extension c in the longitudinal direction departing from the first position which is larger than the positional offset of the supporting element 50 from the first to the second position less half of the longitudinal extension d of the supporting element 50. This ensures a constant overlapping or a constant engagement of the distal end portion 52 and the engagement portion 18 in each position of the supporting element 50.

Finally, the guiding portions 10, 12 each have a guiding notch 24 in order to guide engagement means of the compensating element 4. The guiding notch 24, in particular, has a V-shaped configuration, wherein the portion forming the apex of the V is closest to the resting portion 6 and comes to rest in the first position of the compensating element 4 vertically below the swivel axis z.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A supporting foot for a supporting device of vehicles, comprising:
    a foot element with a resting portion for resting on an underlying surface; and
    a compensating element for receiving a supporting element and for compensating a positional offset of the supporting element from the compensating element, the supporting element being movable between a first and a second position with respect to the foot element by the compensating element being able to be rolled along on the foot element, wherein the foot element comprises a guiding device that guides the supporting element in a longitudinal direction, and
    wherein the guiding device is formed from guiding portions which are arranged on either side of the supporting element and which overlap at least partially with a distal end portion of the supporting element in a vertical direction in such a way that the end portion of the supporting element is arranged between the guiding portions and guided by the guide portions; wherein the guiding portions, in each position of the supporting element, at least partially overlap with the distal end portion thereof;
    wherein the guiding portions are designed as wall portions extending substantially perpendicularly from the resting portion;
    wherein the guiding portions comprise at least one engagement portion whose extension, departing from the first position, in the longitudinal direction is larger than the positional offset from the first to the second position less half of the longitudinal extension of the supporting element; and wherein the guiding portions are arranged between the supporting element and the compensating element.

2. The supporting foot according to claim 1, wherein a rolling surface of the compensating element comprises at least two recesses in which the guiding portions are arranged.

3. The supporting foot according to claim 1, wherein the guiding portions taper towards free ends thereof.

4. The supporting foot according to claim 3, wherein the supporting element is part of a telescopic supporting unit which comprises a second supporting element, wherein the supporting element is movable relative to the second supporting element between an operational position and a travel position, and wherein, in the travel position, the second supporting element engages with the foot element.

5. The supporting foot according to claim 4, wherein, in the travel position, the second supporting element engages with the guiding portions of the foot element.

6. The supporting foot according to claim 5, further comprising:
a pre-tensioning device adapted to pre-tension the compensating element into the first position relative to the foot element, wherein the pre-tensioning device comprises at least one spring which is braced between the foot element and the compensating element.

7. The supporting foot according to claim 6, wherein the guiding portions comprise at least one guiding recess for guiding engagement the compensating element, wherein the guiding recess includes a curved configuration, and wherein the middle portion thereof is closest to the resting portion.

8. The supporting foot according to claim 1, wherein the guiding portions are designed as wall portions extending substantially perpendicularly from the resting portion.

9. The supporting foot according to claim 1, wherein the guiding portions comprise at least one engagement portion whose extension, departing from the first position, in the longitudinal direction is larger than the positional offset from the first to the second position less half of the longitudinal extension of the supporting element.

10. The supporting foot according to claim 1, wherein the supporting element is part of a telescopic supporting unit which comprises a second supporting element, wherein the supporting element is movable relative to the second supporting element between an operational position and a travel position, and wherein, in the travel position, the second supporting element engages with the foot element.

11. The supporting foot according to claim 10, wherein, in the travel position, the second supporting element engages with the guiding portions of the foot element.

12. The supporting foot according to claim 1, further comprising:
a pre-tensioning device adapted to pre-tension the compensating element into the first position relative to the foot element, wherein the pre-tensioning device comprises at least one spring which is braced between the foot element and the compensating element.

13. A supporting foot for a supporting device of vehicles, comprising:
a foot element with a resting portion for resting on an underlying surface; and
a compensating element for receiving a supporting element and for compensating a positional offset of the supporting element from the compensating element, the supporting element being movable between a first and a second position with respect to the foot element by the compensating element being able to be rolled along on the foot element, wherein the foot element comprises a guiding device that guides the supporting element in a longitudinal direction, and wherein the guiding device is formed from guiding portions which are arranged on either side of the supporting element and which overlap at least partially with a distal end portion of the supporting element in a vertical direction in such a way that the end portion of the supporting element is arranged between the guiding portions and guided by the guide portions, and wherein the guiding portions are arranged between the supporting element and the compensating element.

14. The supporting foot according to claim 13, wherein the guiding portions, in each position of the supporting element, at least partially overlap with the distal end portion thereof.

15. The supporting foot according to claim 13, wherein the guiding portions are designed as wall portions extending substantially perpendicularly from the resting portion.

16. The supporting foot according to claim 13, wherein the guiding portions comprise at least one engagement portion whose extension, departing from the first position, in the longitudinal direction is larger than the positional offset from the first to the second position less half of the longitudinal extension of the supporting element.

17. A supporting foot for a supporting device of vehicles, comprising:
a foot element with a resting portion for resting on an underlying surface; and
a compensating element for receiving a supporting element and for compensating a positional offset of the supporting element from the compensating element, the supporting element being movable between a first and a second position with respect to the foot element by the compensating element being able to be rolled along on the foot element, wherein the foot element comprises a guiding device that guides the supporting element in a longitudinal direction, and
wherein the guiding device is formed from guiding portions which are arranged on either side of the supporting element and which overlap at least partially with a distal end portion of the supporting element in a vertical direction in such a way that the end portion of the supporting element is arranged between the guiding portions and guided by the guide portions, and wherein a rolling surface of the compensating element comprises at least two recesses in which the guiding portions are arranged.

18. The supporting foot according to claim 17, wherein the guiding portions, in each position of the supporting element, at least partially overlap with the distal end portion thereof.

19. The supporting foot according to claim 17, wherein the guiding portions are designed as wall portions extending substantially perpendicularly from the resting portion.

20. The supporting foot according to claim 17, wherein the guiding portions comprise at least one engagement portion whose extension, departing from the first position, in the longitudinal direction is larger than the positional offset from the first to the second position less half of the longitudinal extension of the supporting element.

21. A supporting foot for a supporting device of vehicles, comprising:
a foot element with a resting portion for resting on an underlying surface; and
a compensating element for receiving a supporting element and for compensating a positional offset of the supporting element from the compensating element, the supporting element being movable between a first and a second position with respect to the foot element by the compensating element being able to be rolled along on the foot element, wherein the foot element comprises a guiding device that guides the supporting element in a longitudinal direction, and wherein the guiding device is formed from guiding portions which are arranged on either side of the supporting element and which overlap at least partially with a distal end portion of the supporting element in a vertical direction in such a way that the end portion of the supporting element is arranged between the guiding portions and guided by the guide portions, and wherein the guiding portions taper towards free ends thereof.

22. The supporting foot according to claim 21, wherein the guiding portions, in each position of the supporting element, at least partially overlap with the distal end portion thereof.

23. The supporting foot according to claim 21, wherein the guiding portions are designed as wall portions extending substantially perpendicularly from the resting portion.

24. The supporting foot according to claim 21, wherein the guiding portions comprise at least one engagement portion whose extension, departing from the first position, in the longitudinal direction is larger than the positional offset from the first to the second position less half of the longitudinal extension of the supporting element.

* * * * *